United States Patent [19]

Howe

[11] Patent Number: 5,128,404

[45] Date of Patent: Jul. 7, 1992

[54] THERMOPLASTIC BLOW MOLDABLE POLYBUTYLENE TEREPHTHALATE COMPOSITIONS

[75] Inventor: King L. Howe, Wilmington, Del.

[73] Assignee: E. I. Du Pont de Nemours and Company, Wilmington, Del.

[21] Appl. No.: 539,753

[22] Filed: Jun. 18, 1990

[51] Int. Cl.⁵ ............................................. C08L 67/02
[52] U.S. Cl. .................................. 524/456; 524/513; 525/166; 525/176
[58] Field of Search ................. 525/166; 524/456, 513

[56] References Cited

U.S. PATENT DOCUMENTS

| | | | |
|---|---|---|---|
| 4,034,013 | 7/1977 | Lane | 525/64 |
| 4,246,378 | 1/1981 | Kometani et al. | 525/438 |
| 4,659,757 | 4/1987 | Okamoto et al. | 523/436 |
| 4,753,980 | 1/1988 | Deyrup | 524/369 |
| 4,912,167 | 3/1990 | Deyrup et al. | 525/166 |
| 4,914,152 | 4/1990 | Miyashita | 525/68 |
| 4,914,156 | 4/1990 | Howe | 525/166 |

FOREIGN PATENT DOCUMENTS 59-184251 10/1984 Japan .

*Primary Examiner*—Patricia Short

[57] ABSTRACT

Semi-crystalline blow moldable polyester compositions formed by melt blending a mixture consisting essentially of a poly(butylene terephthalate, an ethylene copolymer containing epoxide groups, and an ionomer obtained by neutralizing with $Na^+$ or $K^+$.

5 Claims, No Drawings

THERMOPLASTIC BLOW MOLDABLE POLYBUTYLENE TEREPHTHALATE COMPOSITIONS

BACKGROUND OF THE INVENTION

Polyesters that are semicrystalline, particularly poly(butylene terphthalate) PBT, are used extensively in many applications that require good solvent resistance and good properties at elevated temperatures. They are ordinarily processed by injection molding, but there are many components of automobiles and other systems wherein such parts are hollow and to manufacture these by injection molding is very difficult and expensive. Many such parts can conceivably be made by blow molding provided the polymer system has adequate melt strength and melt viscosity and yields smooth high quality surfaces in the blow molded parts. Unfortunately, polyesters commercially available for injection molding and extrusion have melt viscosities which are too low to make them suitable for extrusion blow molding. It would be desirable to have blow moldable polyester compositions which provide moldings having smooth surfaces made from commercial injection moldable and extrusion grades of polyesters.

The addition of conventional di- and polyepoxides and, more recently, the addition of ethylene copolymers containing glycidyl groups have been suggested for increasing the melt strength and viscosity of polyesters, but are not suitable for blow molding large objects. The addition of catalytic cations to polyester compositions including ethylene copolymers containing glycidyl groups has also been suggested to provide greater increases in melt strength. Unfortunately, such catalyzed compositions can form small lumps when their heat history is severe as is the case in commercial molding operations where significant amounts of resin must be recycled as regrinds. These lumps cause surface imperfections in the molded parts which are objectionable in those application requiring a high degree of surface quality. Thus a need still exists for compositions which will yield large complex blow molded articles having smooth surfaces.

BACKGROUND ART

U.S. Pat. No. 4,659,757, granted Apr. 21, 1987 to Okamoto et al., discloses poly(ethylene terephthalate) (PET) molding compositions yielding impact resistant articles prepared by melt blending PET with 3 to 60 parts of a second polyester selected from the group consisting of (1) copolymers of ethylene glycol, terephthalic acid and aliphatic dicarboxylic acids containing at least 12 carbon atoms (2) copolymers of ethylene glycol, terephthalic acid and a poly(alkylene oxide) glycol, and (3) polyarylates. In addition the compositions must also contain (a) a nucleating agent selected from the group of finely divided inorganic nucleating agents, a metal salt of an organic carboxylic acid and an ionomer, (b) a polyolefin to which has been grafted an olefin having carboxyl or anhydride groups, (c) an olefin copolymer containing units derived from glycidyl (meth)acrylate and optionally units derived from vinyl acetate as a third monomer and (d) an ester-based plasticizer. As claimed, the compositions must contain the second polyester and each of ingredients (a), (b), (c) and (d).

U.S. Pat. No. 4,912,167, granted Mar. 27, 1990 to Deyrup et al and U.S. patent application Ser. No. 07/132,487, filed Dec. 14, 1987 to Howe, disclose compositions which are blow moldable PET or PBT containing an epoxide group-containing copolymer and a source of catalytic metal cations which source could be a small amount of a zinc ionomer, for example. These patents disclose olefin copolymers and acrylate copolymers containing epoxide groups, but prefer the olefin copolymers. The examples of the reference demonstrate that sodium ionomers are ineffective in providing blow moldability when used at the same concentration at which zinc ionomers are effective.

U.S. Pat. No. 4,783,980, granted Jan. 28, 1988 to Deyrup discloses toughened thermoplastic polyester compositions prepared by melt blending at high shear 3–40 weight percent of an ethylene copolymer containing epoxide groups and 10–40 weight percent of units derived from a $C_2$–$C_8$ alkyl (meth)acrylate. A variety of optional ingredients may be added including plasticizers, poly(alkylene oxide) segments and crystallization promoters. As crystallization promoters one can use salts of hydrocarbon acids containing 7 to 54 carbon atoms or salts of ionomeric polymers. Example 1 discloses a poly(ethylene terephthalate) composition which contains 3.8 weight percent of a sodium ionomer of an ethylene/methacrylic acid copolymer added as a crystallization promoter.

U.S. Pat. No. 4,034,013 granted Jul. 5, 1977 to Lane discloses that the notched impact strength and melt strength of PET and PBT are improved by incorporating small particles of a core-shell polymer wherein the core is a rubbery acrylate copolymer and the shell is a more rigid acrylate or styrene copolymer containing epoxide groups.

Japanese Patent Publication 59-184251, published Oct. 19, 1984 discloses that polyether ester block copolymers (100 parts) derived essentially from terephthalic acid, 1,4-butanediol and a poly(alkylene oxide) glycol when melt blended with 1–25 parts of an ionomer resin and 1–25 parts of an olefin copolymer containing epoxide groups form compositions having sufficiently high melt tension to permit extrusion blow molding. The compositions are further characterized as exhibiting good elastic recovery and softness.

U.S. Pat. No. 4,246,378, granted Jan. 20, 1981 to Kometani et al discloses the addition of ethylene copolymers containing glycidyl groups for increasing the melt strength and viscosity of polyesters.

SUMMARY OF THE INVENTION

The present invention improves the melt strengths and melt viscosities of injection molding and extrusion grades of PBT and at the same time eliminates lump formation. The compositions of the present invention provide smooth high quality surfaces in both small and large blow molded parts. The compositions are readily processible by extrusion blow molding to make smooth hollow parts such as containers, furniture elements, appliance parts and automotive components.

More specifically, the compositions of the present invention are semi-crystalline blow moldable polyester compositions comprising melt blends consisting essentially of the following ingredients:

a) 62-88 weight percent of at least one poly(butylene terephthalate) (PBT) having an inherent viscosity of at least about 0.8 dl/g, b) 10-30 weight percent of at least one ethylene copolymer, (E/X/Y), where E is ethylene present in an amount of at least 50 weight percent, X is glycidyl methacrylate at 2-10 weight percent and Y is from 0-40 weight percent of a moiety derived from $C_1$-$C_6$ alkyl(meth)acrylate, and c) 2-8 weight percent of at least one ionomer obtained by neutralizing with $Na^+$ or $K^+$ at least about 40 percent of the carboxyl groups in an ethylene copolymer which contains 9-20 weight percent of units derived from (meth)acrylic acid and 0-35 weight percent of units derived from $C_1$-$C_6$ alkyl (meth)acrylate.

DETAILED DESCRIPTION OF THE INVENTION

The present invention relates to semi-crystalline blow moldable polyester compositions which possess high melt strengths and melt viscosities as well as high quality smooth surface appearance on the blow molded parts.

More specifically, the compositions of the present invention are semi-crystalline blow moldable polyester compositions comprising melt blends consisting essentially of:

a) 62-88 weight percent of at least one poly(butylene terephthalate) (PBT) having an inherent viscosity of at least about 0.8 dl/g, b) 10-30 weight percent of at least one ethylene copolymer, (E/X/Y), where E is ethylene present in an amount of at least 50 weight percent, X is glycidyl methacrylate at 2-10 weight percent and Y is from 0-40 weight percent of a moiety derived from $C_1$-$C_6$ alkyl(meth)acrylate, and c) 2-8 weight percent of at least one ionomer obtained by neutralizing with $Na^+$ or $K^+$ at least about 40 percent of the carboxyl groups in an ethylene copolymer which contains 9-20 weight percent of units derived from (meth)acrylic acid and 0-35 weight percent of units derived from $C_1$-$C_6$ alkyl (meth)acrylate.

The weight percentages given for each of components a), b), and c) are based on the total of these components only.

In the above description, and throughout this application, the designation "(meth)acrylate" is meant to include both "acrylate" and "methacrylate."

Preferred compositions of the present invention are semi-crystalline blow moldable polyester compositions comprising melt blends consisting essentially of:

a) 69-85 weight percent of at least one poly(butylene terephthalate) (PBT) having an inherent viscosity of at least about 0.8 dl/g, b) 12-25 weight percent of at least one ethylene copolymer, (E/X/Y), where E is ethylene present in an amount of at least 57 weight percent, X is glycidyl methacrylate at 4-8 weight percent and Y is from 10-35 weight percent of a moiety derived from $C_1$-$C_6$ alkyl(meth)acrylate, and c) 3-6 weight percent of at least one ionomer obtained by neutralizing with $Na^+$ or $K^+$ at least about 40 percent of the carboxyl groups in an ethylene copolymer which contains 9-20 weight percent of units derived from (meth)acrylic acid and 0-35 weight percent of units derived from $C_1$-$C_6$ alkyl (meth)acrylate.

Component a) is poly(butylene terephthalate) (PBT) having an inherent viscosity of at least about 0.8 dl/g. PBT is a well-known commercial product. It is normally made by transesterification of dimethyl terephthalate with excess 1,4-butanediol followed by polycondensation. It is also possible to start with terephthalic acid and butanediol. In order to obtain resins having inherent viscosities of at least about 0.8 dl/g it is necessary to use a continuous finisher when melt condensation is used exclusively. With batch finishing, melt condensation followed by solid phase condensation is generally required to obtain the desired inherent viscosities.

Compositions prepared from PBT having inherent viscosities near the minimum value stated above are generally suitable for extrusion blow molding of articles requiring the use of parisons having a length of up to about 30.5 cm (one foot). To prepare compositions which can be used to form larger parisons, resins having inherents above about 0.8 dl/g are preferred.

Component b) is an ethylene copolymer, E/X/Y, where E is ethylene present in amounts of at least 50 weight percent, X is glycidyl (meth)acrylate from 2-10 weight percent and Y is about 0-40 weight percent of at least one $C_1$-$C_6$ alkyl (meth)acrylate. Thus, component b) may be a dipolymer of ethylene and glycidyl (meth)acrylate. More preferred are terpolymers containing up to 40 weight percent of units derived from meth(acrylate) lower alkyl esters of which n-butyl acrylate is preferred. Most preferred are terpolymers of ethylene containing 10-35 weight percent of n-butyl acrylate and 4-8 weight percent of glycidyl methacrylate.

Component b) is used in amounts of 10-30 weight percent, and more preferably 12-25 weight percent based on the total weight of components a), b) and c). Since components b) and c) each contribute to the blow moldability of the instant compositions by increasing melt viscosity, melt strength and die swell, the preferred amount of component b) used within the aforementioned ranges is partly dependent on the level of component c). The epoxide content of component b) is another factor which affects the amount of component b) used. In general, the greater the epoxide content of component b), the less of component b) will be required. Further guidance regarding the amounts of component b) to be used is provided in the samples hereinafter.

Component c) is an ionomer obtained by neutralizing with $Na^+$ or $K^+$ at least about 40 percent of the carboxyl groups contained in an ethylene copolymer containing about 9-20 weight percent of units derived from (meth)acrylic acid. Optionally these ionomers may contain up to about 35 weight percent of units derived from $C_1$-$C_6$ alkyl (meth)acrylate. A preferred termonomer is n-butyl acrylate. Component c) is used in amounts of 2-8 weight percent, preferably 3-6 weight percent based on the total weight of components a), b) and c). Since component c) contributes to the blow moldability of the compositions of this invention, the preferred amount of component c) used depends at least in part on the amount of component b) present in a given composition. In addition, component c) improves the stability of the molten composition during processing which in turn permits extrusion of smooth parisons and forming molded articles with smooth surfaces.

As noted hereinbefore, each of components b) and c) contributes to the blow moldability of the compositions of this invention. In general, increasing the concentration of either of these components within the ranges specified will raise the melt viscosity of a given blow molding composition. While blow moldability is more than a function of melt viscosity, for guidance it should be noted that compositions having melt viscosities at about 260° C. of at least about 10,000 to 15,000 Pa sec at 1 $sec^{-1}$ are usually suitable for forming articles requiring a parison of up to about 61 cm (2 feet) in length and compositions having melt viscosities at the above temperature of at least about 20,000 to 30,000 Pa sec at 1 sec$^{-1}$ are usually suitable for forming articles requiring a parison greater than 61 cm in length. As previously suggested, reference to the Samples contained below will assist one in selecting amounts of components b) and c) which will yield a composition suitable for a given molding application. The melt rheology of the composition of the present invention makes them suitable for thermoforming applications.

The compositions of the present invention may contain minor amounts of a variety of additives which are frequently used in plastics. Such additives include antioxidants, UV stabilizers, dyes, pigments, flame retardants, fibrillatable fluoropolymers and fillers. The use of reinforcing fillers such as chopped glass fibers and acicular calcium metasilicate permits the preparation of moldings which exhibit exceptional rigidity. Reinforcing fillers may be used in amounts of up to about 40 parts per hundred parts (pph) the total weight of components a), b) and c) which three ingredients total 100 percent. In other words, up to about 40 parts by weight of filler can be used for 100 parts by weight of components a), b) and c). The presence of reinforcing fillers generally raises the melt viscosity of the compositions of this invention. If significant amounts of reinforcing fillers are used it may be necessary to either (1) decrease the amounts within the limits specified herein of components b) and c), each of which enhances melt viscosity; or (2) employ PBT, component a) with an inherent viscosity approaching the lower limit of 0.8 dl/g.

In the following samples the various samples were prepared by melt blending the indicated ingredients, by extrusion in a 28 or 57 mm twin screw extruder.

For illustration, the feed rates for Sample 5-1 in Table V are as follows:
Component a): 40.8 kg/hr.
Component b): 11.6 kg/hr.
Additive B: 136 gm/hr.

The ingredients for Sample 5-1 were blended on a Werner and Pfleiderer bilobal twin screw extruder having a diameter of 57mm and a length to diameter ratio of 37. The screw used was a general purpose screw with vacuum capability consisting of conveying elements to convey the feed material from the feed zone to a melting zone in which the material was compressed and melting begins. A section of "kneading blocks" followed by "reverse elements" next provides high shear and pressure to further the melting and mixing process. The reverse elements serve also to provide a melt seal following which the melt is decompressed in the section under vacuum. Following the vacuum zone, introduced via a side feeder, for Sample 5-1 in Table V at the rate of 15.47 kg/hour was a mixture obtained by dry blending 125.9 kg of component a) and 28.99 kg of component c). After the side feeder, the screw recompresses the melt and passes it through kneading blocks and reverse elements which also serve as a vacuum seal for a second vacuum zone. Then the melt is recompressed and mixed as it passes through the end of the extruder and out the die.

For the remaining Samples in Tables VI, the amounts and proportions of the various components can be calculated from the information in Tables VI.

Representative extrusion conditions for the compositions shown in Table V are:

| Setting Zone 1 (°C.) | Setting Zone 2 (°C.) | Setting Zone 3 (°C.) | Setting Zone 4 (°C.) | Setting Zone 5-10 (°C.) | Setting Die (°C.) |
|---|---|---|---|---|---|
| 240 | 240 | 240 | 240 | 230 | 250 |

| Sample | Screw Speed (rpm) | Extru. Rate Kg/hr | Melt Temp (°C.) |
|---|---|---|---|
| 5-1 | 200 | 68.1 | 322 |
| 5-2 | 200 | 68.1 | 322 |

Representative extrusion conditions for the compositions shown in Table VI are:

| Setting Zone 1 (°C.) | Setting Zone 2 (°C.) | Setting Zone 3 (°C.) | Setting Zone 4 (°C.) | Setting Zone 5-10 (°C.) | Setting Die (°C.) |
|---|---|---|---|---|---|
| 240 | 240 | 240 | 240 | 230 | 250 |

| Sample | Screw Speed (rpm) | Extru. Rate Kg/hr | Melt Temp (°C.) |
|---|---|---|---|
| 6-1 | 150 | 68.1 | 289 |
| 6-1A | 200 | 68.1 | 308 |
| 6-2 | 150 | 68.1 | 300 |
| 6-2A | 200 | 68.1 | 309 |
| 6-3 | 150 | 68.1 | 294 |
| 6-4 | 150 | 68.1 | 296 |
| 6-5 | 150 | 68.1 | 289 |
| 6-6 | 150 | 68.1 | 289 |
| 6-7 | 150 | 68.1 | 292 |
| 6-8 | 150 | 68.1 | 290 |
| 6-9 | 150 | 68.1 | — |
| 6-9A | 200 | 68.1 | 305 |
| 6-10 | 150 | 68.1 | — |

The product was extruded at a rate of 68 kgs/hour through a six hole die. Temperature of the melt exiting the extruder die was measured as the melt temperature. Melt strands exiting the extruder were quenched in water and cut into pellets. The pelletized product was dried at 95° C. in a circulating air drier equipped with dehumidifier.

For Table VII the ingredients of the compositions were placed in a polyethylene bag and tumbled to mix.

The resulting dry blend was melt blended on a Werner and Pfleiderer twin-screw extruder having a diameter of 28 mm and a length to diameter ratio of 27.5. The screw used is a general purpose screw with vacuum capability consisting of conveying elements to convey the feed materials from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die.

Representative extrusion conditions for the compositions shown in Table VII for each sample are:

| Setting Zone 1 (°C.) | Setting Zone 2 (°C.) | Setting Zone 3 (°C.) | Setting Zone 4 (°C.) | Setting Zone 5-10 (°C.) | Setting Die (°C.) |
|---|---|---|---|---|---|

-continued

| | 260 | 260 | 260 | 260 | 260 | 260 |
|---|---|---|---|---|---|---|

| Sample | Screw Speed (rpm) | Extru. Rate Kg/hr | Melt Temp (°C.) |
|---|---|---|---|
| 7-1 | 150 | 7.4 | 305 |
| 7-2 | 150 | .7.5 | 307 |
| 7-3 | 150 | 7.9 | 298 |
| 7-4 | 150 | 8.0 | 304 |
| 7-5 | 150 | 7.4 | 299 |
| 7-6 | 150 | 7.4 | 298 |
| 7-7 | 150 | 7.5 | 297 |

Temperatures of the melt exiting the extruder die were measured and reported above. The melt strand exiting the extruder was quenched in water and cut into pellets. The pelletized product was dried in a vacuum oven, set at 95° C. and purged with a slight nitrogen sweep overnight. For example, Sample 7-2 had a melt viscosity, measured using a Kayeness viscometer at 260° C. of 23000 Pa sec at 1 sec-1, and 1200 Pa sec at 1000 sec-1.

Some of the dried resins for each extruded sample from Tables V through VII were blow molded using a Rocheleau molding machine equipped with a single-screw extruder. The screw had a 3.81 cm diameter, a length to diameter ratio of 20 and a compression ratio of 2 to 1. Additionally, Sample 5-1 was blow molded into a car spoiler using a Sterling molding machine equipped with a 8.9 cm diameter barrier type screw with a length to diameter ratio of 24:1 and an accumulator of the first-in-first-out design with a capacity of 6.8 kg. The extruder barrel of the blow molding machine was heated and the temperature regulated at 249° C. for each of the four temperature zones. The three zones of the accumulator were set at 257°·C., 260° C., and 263° C. and the die at 265° C. The extruder screw was operated at a rate of 30 RPM. The car spoiler mold was heated to 71° C.:

The blow molding temperature profile used to produce the blow molded part that appears in Table V, Sample 5-2, is:

| Setting Feed Zone (°C.) | Setting Transition Zone (°C.) | Setting Metering Zone (°C.) | Setting Die Zone (°C.) |
|---|---|---|---|
| 260 | 260 | 270 | 265 |

| Sample | Screw Speed (rpm) | Mold Geometry |
|---|---|---|
| 5-2 | 69 | Bottle |

Representative blow molding conditions and temperature profiles used to produce the blow molded parts that appear in Table VI are:

| Setting Feed Zone (°C.) | Setting Transition Zone (°C.) | Setting Metering Zone (°C.) | Setting Die Zone (°C.) |
|---|---|---|---|
| 240 | 260 | 265 | 260 |

| Sample | Screw Speed (rpm) | Mold Geometry |
|---|---|---|
| 6-1 | 76 | Bottle |
| 6-1A | *— | — |
| 6-2 | 86 | Bottle |
| 6-2A | 95 | Bottle |
| 6-3 | 100 | Bottle |
| 6-4 | 84 | Bottle |
| 6-5 | 94 | Bottle |
| 6-6 | 97 | Bottle |
| 6-7 | 93 | Bottle |
| 6-8 | 100 | Bottle |
| 6-9 | 91 | Bottle |
| 6-9A | 100 | Bottle |
| 6-10 | 95 | Bottle |

*Sample not blow molded.

Representative blow molding conditions and temperature profiles used to produce the blow molded parts that appear in Table VII are:

| Sample | Setting Feed Zone (°C.) | Setting Transition Zone (°C.) | Setting Metering Zone (°C.) | Setting Die Zone (°C.) |
|---|---|---|---|---|
| 7-1 to 7-2 | *260 | 260 | 260 | 250 |
| 7-3 to 7-7 | *240 | 240 | 245 | 245 |

| Sample | Screw Speed (rpm) | Mold Geometry |
|---|---|---|
| 7-1 | 98 | Bottle |
| 7-2 | 77 | Bottle |
| 7-3 | 60 | Bottle |
| 7-4 | 68 | Bottle |
| 7-5 | 58 | Bottle |
| 7-6 | 47 | Bottle |
| 7-7 | 160 | Bottle |

*For Samples 7-1 and 7-2, the barrel temperature was inadvertently set too high. Lower settings were used for Samples 7-3 to 7-7. (Higher barrel setting tends to cause more sag of the parison, which becomes very important in making larger objects).

The resins for each Sample in the Tables above were extruded at the designated screw speed through the die to produce a parison. Upon closing the molded, the part is blown with air at about 400 MPa. The blown part is cooled in the mold under pressure and ejected. The mold geometry of the bottles are 22.5 cm high and 7.5 cm diameter; and the automobile spoilers have dimensions of 136 cm long, 9 cm wide and 1.5 cm thick.

A number of physical properties were measured for each composition. The flexural modulus was measured according to ASTM Procedure D-790. Samples were also tested for melt viscosity. The measurement of melt viscosity is described below:

Blow molding resins were first dried in a vacuum oven at 110° C. overnight. Melt viscosity was measured using a Kayeness Rheometer under the following test conditions:
Temperature: 260° C.
Die, Length to diameter ratio: 20
Die Length: 15.24 mm
Die diameter: 0.76 mm
Piston diameter: 9.53 mm
Piston rate: 1.52 to 152 mm/minute In Table I, the inherent viscosity of PBT was measured at 25° C. according to ASTM Procedure D-2857, "Standard Method for Dilute Solution Viscosity of Polymers". Viscosity was measured using a solution containing 0.5 gm polymer per 100 ml of solution. The solvent used consisted of a mixture of 1 part trifluoroacetic acid and 3 parts methylene chloride by volume. The polyesters, ethylene copolymer, ionomers, and additives used in the Samples are defined in the following Tables (I through IV).

In the following Examples, all percentages of component a), b) and c) and all additives are given by weight. The amounts of additives, other than component a), b) and c) are given in pph of the total weight of components a), b) and c). All values originally obtained in British units have been converted to S.I. units and rounded, where appropriate, and finally blanks in the Tables denote either absence of a particular component or that a particular test was not run.

TABLE I

Identification of Component a)

Description

Polybutylene terephthalate (PBT) homopolymer with a melt index of 6.0-7.5 gm/10 min. by ASTM D1238 (240° C., 2160 gram weight) having an inherent viscosity of 0.93 dl/g.

TABLE II

Identification of Component b)

Description

Terpolymer of ethylene/27% butyl acrylate/5% glycidyl methacrylate

TABLE III

| Code | Identification of Component c) Description |
|---|---|
| A | Sodium ionomer derived from ethylene/15% methacrylic acid copolymer (MAA) in which 59% of the acid groups have been converted to the corresponding sodium salt. |
| B | Sodium ionomer derived from ethylene/10% MMA copolymer in which 75% of the acid groups have been converted to the corresponding sodium salt. |

TABLE IV

| Code | Identification of Additives |
|---|---|
| A | Bis (2,4-Di-t-butylphenyl) Pentaerythritol diphosphite |
| B | Tetrakis [methylene (3,5-di-ter-butyl 4-hydroxyhydrocinnamate)] methane |
| C | Zinc ionomer derived from ethylene/10% MAA copolymer in which 71% of the acid groups have been converted to the corresponding zinc salt. |

Samples 5-1 and 5-2 in Table V illustrate the compositions of the present invention blow molded into automobile spoilers and bottles, respectively.

In particular, the extruded parison had the smooth glossy surfaces and the high melt strength needed for blow molding of large parts with good surface quality.

TABLE V

Toughened PBT Blow Molding Composition

| Sample | % Comp (a) | % Comp (b) | ID Comp (c) | % Comp (c) | Additive B (pph) |
|---|---|---|---|---|---|
| 5-1 | 78.6 | 17.2 | A | 4.3 | 0.2 |
| 5-2 | 78.6 | 17.2 | A | 4.3 | 0.2 |

| Sample | Melt Temp °C. | RPM | Kg/hr. | Viscosity Pa sec @ 1 sec$^{-1}$ | Viscosity Pa sec @ 1000 sec$^{-1}$ |
|---|---|---|---|---|---|
| 15-1 | 322 | 200 | 68.1 | 38515 | 1545 |
| 15-2 | 322 | 200 | 68.1 | 38515 | 1545 |

| Sample | Viscosity Temp (°C.) | Flex Mod (MPa) | Part Quality |
|---|---|---|---|
| 15-1 | 260 | 1447 | Spoilers had smooth glossy surface; parts were impact resistant. |

TABLE V-continued

Toughened PBT Blow Molding Composition

| 15-2 | 260 | 1447 | Bottles were smooth inside and outside: Excellent melt strength |
|---|---|---|---|

Samples 5-1 and 5-2 refer to the same blow molding composition but they are distinguished from one another by forming to different parts.

Samples 6-1 through 6-10 in Table VI illustrate the compositions of the present invention when component c) contains sodium and/or zinc.

Compare Sample 6-3 to 6-7 and Sample 6-2 to 6-5, these comparisons show that melt viscosity at 1 sec$^{-1}$ increases as the level of component c) is increased. However, when comparing Sample 6-7 to control Sample 6-8 it can be seen that in the presence of sodium ionomer the addition of 0.5% of zinc ionomer had no significant effect on melt viscosity.

Comparison of Sample 6-3 to 6-4 illustrates that in the presence of 5% sodium ionomer, component c), the addition of 0.5% of a zinc ionomer further enhances melt viscosity at 1 sec$^{-1}$, however, at the same time, melt viscosity at 1000 sec$^{-1}$ is unchanged, indicating that processibility of the composition is not adversely affected with the improvement in melt strength. Hence, the zinc ionomer while not essential in the present composition had a minor beneficial effect.

TABLE VI

Effect of Sodium and Zinc Ionomers, Component C

| Sample | % Comp a | % Comp b | Comp C ID & (%) A | B | Additive A (pph) | Additive B (pph) | Additive C (pph) |
|---|---|---|---|---|---|---|---|
| 6-1 | 76.9 | 18.1 | 5.0 | — | 0.3 | 0.2 | — |
| 6-1A | | | | | | | |
| 6-2 | 76.8 | 18.2 | 5.1 | — | 0.3 | 0.2 | 0.5 |
| 6-2A | | | | | | | |
| 6-3 | 78.9 | 16.1 | 5.1 | — | 0.3 | 0.2 | — |
| 6-4 | 78.8 | 16.2 | 5.0 | — | 0.3 | 0.2 | 0.5 |
| 6-5 | 78.9 | 18.1 | 3.0 | — | 0.3 | 0.2 | — |
| 6-6 | 78.9 | 18.2 | 2.5 | — | 0.3 | 0.2 | 0.5 |
| 6-7 | 80.9 | 16.1 | 3.0 | — | 0.3 | 0.2 | — |
| 6-8 | 80.8 | 16.2 | 3.0 | — | 0.3 | 0.2 | 0.5 |
| 6-9 | 78.8 | 17.1 | 4.0 | — | 0.3 | 0.2 | 0.25 |
| 6-9A | | | | | | | |
| 6-10 | 78.8 | 17.1 | 1.0 | 3 | 0.3 | 0.2 | 0.25 |

| Sample | Melt Temp (°C.) | RPM | Kg/hr | Viscosity Pa sec @ 1 sec$^{-1}$ | Viscosity Pa sec @ 1000 sec$^{-1}$ |
|---|---|---|---|---|---|
| 6-1 | 289 | 150 | 68.1 | 40000 | 1900 |
| 6-1A | 308 | 200 | 68.1 | 35516 | 1331 |
| 6-2 | 300 | 150 | 68.1 | 43588 | 1527 |
| 6-2A | 309 | 200 | 68.1 | 39314 | 1351 |
| 6-3 | 294 | 150 | 68.1 | 29109 | 1451 |
| 6-4 | 296 | 150 | 68.1 | 33122 | 1447 |
| 6-5 | 289 | 150 | 68.1 | 22604 | 1174 |
| 6-6 | 289 | 150 | 68.1 | 21545 | 970 |
| 6-7 | 292 | 150 | 68.1 | 18735 | 1023 |
| 6-8 | 290 | 150 | 68.1 | 18074 | 1011 |
| 6-9 | — | 150 | 68.1 | 29692 | 1405 |
| 6-9A | 305 | 200 | 68.1 | 24895 | 1103 |
| 6-10 | — | 150 | 68.1 | 26000 | 1319 |

| Sample | Bottle Quality |
|---|---|
| 6-1 | Tough bottles, smooth surfaces |
| 6-1A | |
| 6-2 | Tough bottles, smooth surfaces, strong melt |
| 6-2A | |
| 6-3 | Tough bottles, smooth surfaces, strong melt |
| 6-4 | Tough bottles, smooth surfaces, strong melt |
| 6-5 | Tough bottles, smooth surfaces |
| 6-6 | Tough bottles, smooth surfaces |
| 6-7 | Tough bottles, smooth surfaces |
| 6-8 | Tough bottles, smooth surfaces |
| 6-9 | Tough bottles, smooth surfaces, strong melt |

TABLE VI-continued

| Effect of Sodium and Zinc Ionomers, Component C | |
|---|---|
| 6-9A | Tough bottles, smooth surfaces, strong melt |
| 6-10 | Tough bottles, smooth surfaces, strong melt |

Samples 7-1 through 7-7 in Table VII compare compositions containing zinc and sodium ionomer.

Sample 7-1, which is a control Sample, contains no component c). The melt viscosity is lower than Sample 7-2 which contains component c).

Samples 7-1 through 7-4 show an increase in melt viscosity at both 1 sec$^{-1}$ and 1000 sec$^{-1}$ as the level of sodium ionomer increases.

Samples 7-2, 7-5 and 7-6 illustrate the increase in melt viscosity at both 1 sec$^{-1}$ and 1000 sec$^{-1}$ as the level of component b) increases.

Comparison of Sample 7-1 and 7-7, illustrate that the use of component c) in Sample 7-7 results in the desired increase of melt viscosity. However, melt extrudate of Sample 7-7 is lumpy in contrast to the smooth extrudate of Sample 7-2.

Thus, Table VII shows that component c), A, is superior to Additive C in providing not only high melt strength but substantially improved surface in the extruded parisons.

TABLE VII

Comparison of Zinc and Sodium Ionomers

| Sample | % Comp a | % Comp b | ID Comp c | % Comp c | Additive B (%) | Additive C (pph) |
|---|---|---|---|---|---|---|
| *7-1 | 83 | 17.05 | — | — | 0.2 | — |
| 7-2 | 78 | 17.05 | A | 4.26 | 0.2 | — |
| 7-3 | 81 | 17.05 | A | 2.00 | 0.2 | — |
| 7-4 | 75 | 17.05 | A | 8.00 | 0.2 | — |
| 7-5 | 84 | 12.0 | A | 4.26 | 0.2 | — |
| 7-6 | 74 | 22.0 | A | 4.26 | 0.2 | — |
| *7-7 | 82.8 | 17.05 | — | — | 0.2 | 0.51 |

| Sample | Melt Temp (°C.) | RPM | Kg/hr | Viscosity Pa sec @ 1 sec$^{-1}$ | Viscosity Pa sec @ 1000 sec$^{-1}$ |
|---|---|---|---|---|---|
| *7-1 | 305 | 150 | 7.4 | 7345 | 544 |
| 7-2 | 307 | 150 | 7.5 | 23000 | 1200 |
| 7-3 | 298 | 150 | 7.9 | 9500 | 850 |
| 7-4 | 304 | 150 | 8.0 | 31500 | 1700 |
| 7-5 | 299 | 150 | 7.4 | 10500 | 1300 |
| 7-6 | 298 | 150 | 7.4 | 37000 | 1600 |
| *7-7 | 297 | 150 | 7.5 | 14230 | 637 |

| Sample | Bottle Quality |
|---|---|
| *7-1 | Smooth bottles inside and outside |
| 7-2 | Smooth bottles inside and outside; strong melt |
| 7-3 | Smooth bottles inside and outside |
| 7-4 | Smooth bottles inside and outside; strong melt |
| 7-5 | Smooth bottles inside and outside |
| 7-6 | Smooth bottles inside and outside; strong melt |
| *7-7 | Smooth bottles inside and outside |

*Control

I claim:

1. A semi-crystalline extrusion blow-moldable polyester composition comprising melt blends consisting essentially of:
   a) 62-88 weight percent at least one poly(butylene terephthalate) PBT homopolymer having an inherent viscosity of at least 0.80 dl/g,
   b) 10-30 weight percent of at least one ethylene terpolymer, E/X/Y, where E is ethylene at least 57 weight percent, X is glycidyl methacrylate from 4-8 weight percent and Y is from 10-35 weight percent of n-butyl acrylate, and
   c) 2-8 weight percent of at least one ionomer obtained by neutralizing with Na$^+$ or K$^+$ at least 40 percent of the carboxyl groups in an ethylene copolymer which contains about 9-20 weight percent of units derived form (meth)acrylic acid and 0-35 weight percent of units derived from C$_1$-C$_6$ alkyl (meth)acrylate, the weight percentages given for each of components a), b) nd c) being based on the total of these components only.

2. The composition of claim 1 wherein component a) is present in an amount of 69-85 weight percent, component b) is present in an amount of 12-25 weight percent, component c) is present in an amount of 3-6 weight percent.

3. The composition of claim 1 wherein component c) is obtained by neutralizing with Na$^+$.

4. The composition of claim 1 which optionally contains up to about 40 parts of at least one filler per 100 parts of the total weight of components a), b), and c).

5. The composition of claim 4 wherein the filler is selected from chopped glass and acicular calcium metasilicate.

* * * * *